Figure 6:
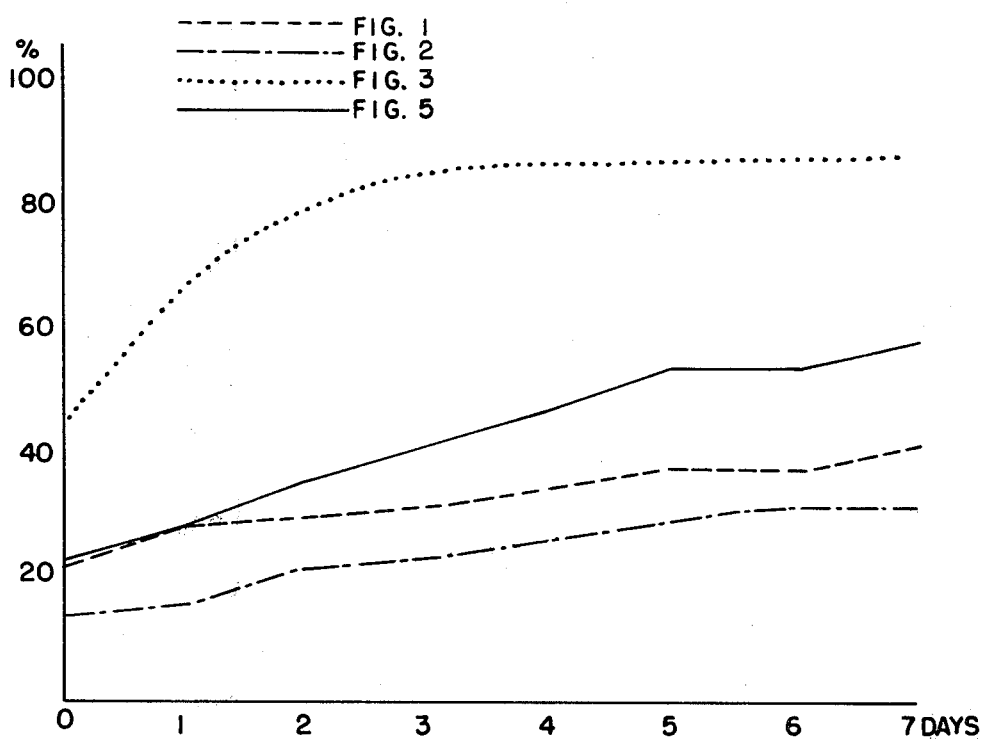

United States Patent [19]
Adams et al.

[11] 4,442,627
[45] Apr. 27, 1984

[54] SEED PLANTING DEVICE

[75] Inventors: James E. Adams, Billericay; Alexander S. Laurie, Royston, both of England

[73] Assignee: Wilkinson Sword Limited, England

[21] Appl. No.: 306,915

[22] PCT Filed: Mar. 2, 1981

[86] PCT No.: PCT/GB81/00031
§ 371 Date: Sep. 25, 1981
§ 102(e) Date: Sep. 25, 1981

[87] PCT Pub. No.: WO81/02503
PCT Pub. Date: Sep. 17, 1981

[51] Int. Cl.³ .............................................. A01C 1/04
[52] U.S. Cl. ................................................... 47/56
[58] Field of Search ................................... 47/56, 48.5

[56] References Cited
U.S. PATENT DOCUMENTS

| 1,380,253 | 5/1921 | Rodger | 47/56 X |
| 2,776,634 | 1/1957 | Morton | 47/48.5 X |
| 3,098,320 | 7/1963 | Estkowski | 47/56 |
| 3,098,321 | 7/1963 | Estkowski et al. | 47/56 |
| 3,908,308 | 9/1975 | Meyers | 47/56 |
| 4,080,755 | 3/1978 | Crosby | 47/56 |
| 4,353,183 | 10/1982 | Estkowski | 47/56 |

FOREIGN PATENT DOCUMENTS

| 7401658 | 8/1975 | Netherlands | 47/56 |
| 705926 | 3/1954 | United Kingdom | 111/7 |

Primary Examiner—Robert E. Bagwill
Attorney, Agent, or Firm—Maky, Renner, Otto & Boisselle

[57] ABSTRACT

A seed planting device is disclosed comprising a generally flat strip 1 pointed at one end for insertion into the ground with a seed 3 mounted on the underside of a tongue 7 bent outwardly from the plane of the strip.

7 Claims, 8 Drawing Figures

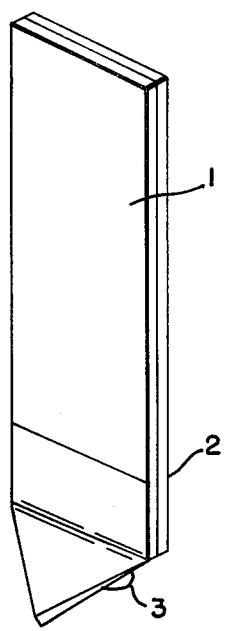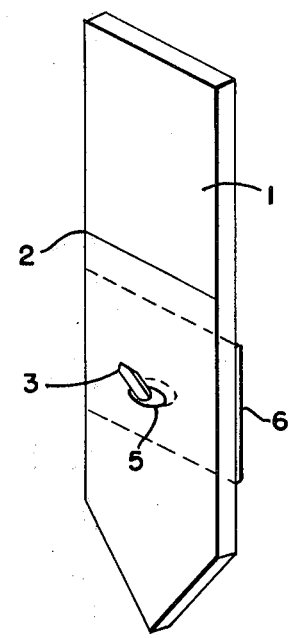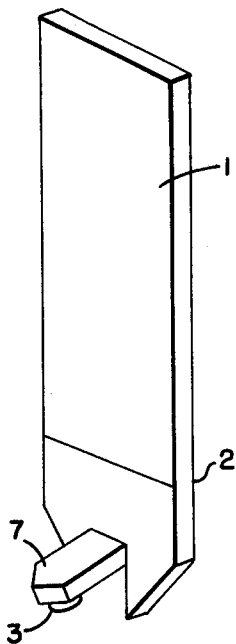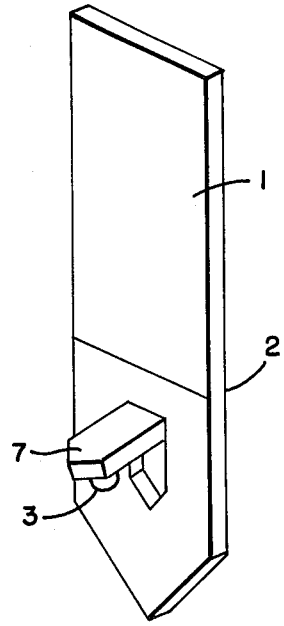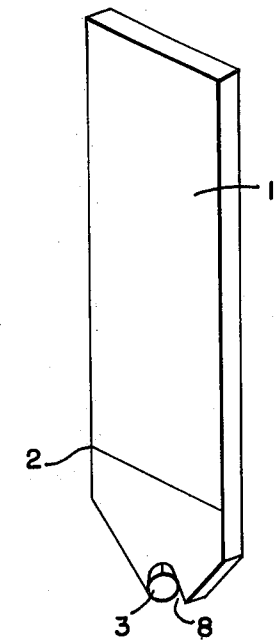

SEED PLANTING DEVICE

This invention relates to seed planting devices of the type comprising an elongated strip of rigid or semi-rigid material, e.g. of wood, plastics or stiff cardboard, preferably pointed at one end for easy insertion into the ground, and carrying at or adjacent said end, one or more plant seeds adhering or otherwise secured to the strip, so that the seeds can be planted at precise locations and at precise depths simply by pressing the strip into the ground. If desired the strip can be marked with an indicating mark to indicate the precise planting depth, and may be impregnated with, or otherwise support, in a position adjacent the seeds, a nutrient or fertilizer to promote the germination and/or growth of the seed, and/or with a fungicide, pesticide or other protective material to provide a protected environment for the seed growth. For convenience herein, such seed planting devices are referred to as 'seed sticks'.

Seed sticks of the foregoing type are known and are disclosed, for example, in U.S. Pat. Nos. 3,098,320, 3,098,321, 3,846,954 and 3,908,308.

The present invention provides an improved configuration for such seed sticks which appears to enhance germination and accelerate emergence of the seed or seeds mounted thereon.

In accordance with the disclosures of U.S. Pat. Nos. 3,846,954 and 3,908,308, the seeds are first mixed with a molten wax-like material, e.g. polyethylene glycol, to form a uniform dispersion of the seeds in the wax carrier and then cast into apertures in the stick, and chilled so that the wax sets.

In U.S. Pat. No. 3,098,320 the seed or seeds are adhesively secured to the face of the stick and optionally covered by a layer of porous paper, e.g. blotting paper, which protects the seeds and prevents them from being knocked off as the stick is inserted into the ground. The porous protecting layer is also said to provide a wicking function to draw moisture up to the seed. In U.S. Pat. No. 3,098,321, a similar arrangment is disclosed but in this case an indentation is provided in the stick to accommodate the seed or seeds.

In accordance with the present invention we have found that the germination of seeds and/or their rate of emergence is enhanced if the seed or seeds, instead of being mounted in an aperture or indentation, or even on the face of the stick, are mounted on a side tab projecting from the plane of the stick to one side thereof. The reason for the improved germination and/or rate of emergence, which has been noted in a number of different species, is not at all clear. Improved contact with the soil does not seem to be the reason since stick configurations specifically designed to enhance contact with the soil, for example, by mounting the seed at the very tip of a pointed seed stick, do not provide any significant improvement in germination or rate of emergence.

Five different seed stick configurations, two in accordance with the present invention, which have been tested in plant growth trials are illustrated in the accompanying drawings. In each case the stick itself comprises a strip of stiff cardboard 1, pointed at one end and marked with a line 2 indicating the desired planting depth. In each case a single plant seed 3 is mounted on the stick using gum arabic (50% aqueous solution) as the adhesive. Other adhesives may be used such as polyvinyl acetate and gum guar, provided that they are non-toxic to the plant seed, but gum arabic is preferred. Complete encapsulation of the seed by the adhesive is best avoided, although improved germination and accelerated emergence are obtained even where the seeds are completely encapsulated, e.g. by immersion in the adhesive solution prior to mounting on the seed stick.

Figure 7:
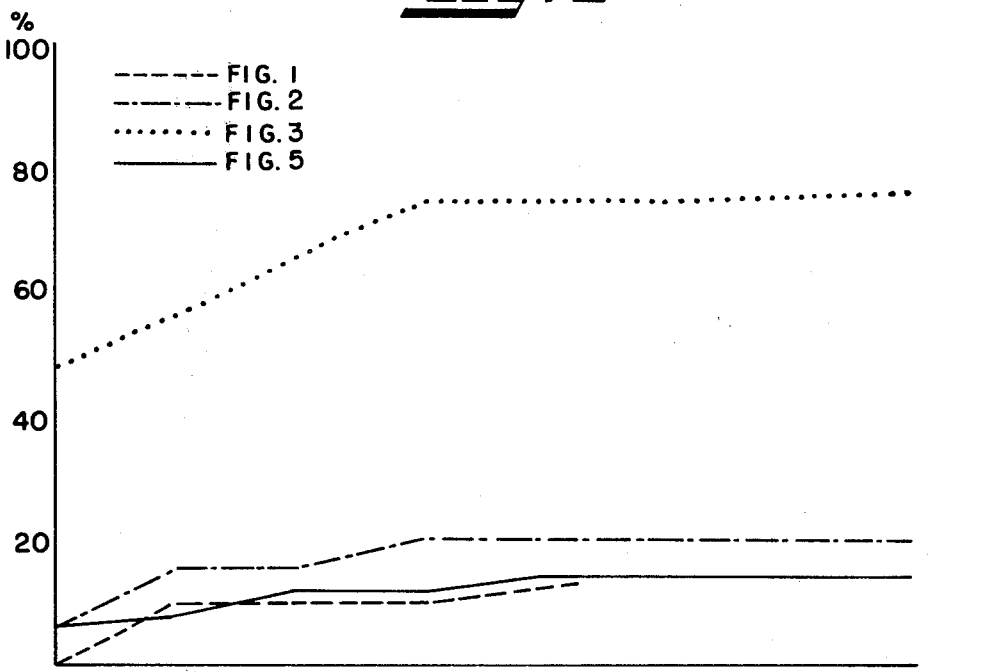

FIGS. 1–5 depict different seed stick configurations.
FIGS. 6–7 depict the results of emergence tests.

In FIG. 1, the seed stick is formed from two layers of cardboard separated at the tip (see the enlargement of FIG. 1a) to form a recess of which receives the seed.

In FIG. 2, the seed 3 is received in a hole 5 in the cardboard strip 1. On the reverse side, a strip 6 of brown paper coated with gum arabic solution is stuck across the strip so that an area of the adhesive is exposed through the hole 5 to hold the seed therein.

In FIG. 3, which is a first configuration in accordance with the present invention, a tongue or tab 7 is pressed out of the plane of the strip 1 at the pointed end, with the seed 3 being adhesively mounted on the underside of the tab.

FIG. 4, also in accordance with the invention, shows an alternative but similar arrangement in which the tongue or tab 7 is pressed out of the plane of the strip 1 at a location spaced from the pointed end of the strip.

In FIG. 5, the seed is located in a notch 8 formed in the pointed end of the strip.

Using stick configurations shown in FIGS. 1, 2, 3 and 5 growth trials have been carried out using lettuce and onion seeds. In these trials the seed sticks were planted to a uniform depth (seed depth 9 mm) in seed trays filled to a depth of 5 cms, with white sand which is known to be a poor nutrient, the sticks being planted at a uniform distance one from the other in a regular grid pattern, 50 sticks to a tray. The trays were maintained at a constant temperature (20° C.) in a room of controlled relative humidity (50%) and under constant fluorescent light. The moisture content of the sand was maintained at a constant 10% by volume.

The trays were inspected at noon each day and the number of seedlings showing counted and expressed as a percentage of the total. The results are illustrated graphically in FIGS. 6 and 7 of the accompanying drawings and clearly demonstrate the substantial increase in rate of emergence of seeds mounted on seed sticks having the configuration of FIG. 3, i.e. according to the invention, as compared with seed sticks of the other three configurations, i.e. FIGS. 1, 2 and 5, and also a substantial increase in the total number of seeds germinated at the end of seven days. Similar results are obtainable using seed sticks of the configuration shown in FIG. 4. FIG. 6 shows the results obtained using lettuce seed and FIG. 7 those obtained using onion seed. In both graphs day 0 represents the first day upon which emergence was noted.

To reduce moisture loss by evaporation from the upper, exposed end of the stick, the upper end of the stick is preferably coated or impregnated with a water impermeable material, e.g. paraffin wax.

In a further series of trials seed sticks according to the present invention (FIGS. 3 and 4) were compared with seed stick configurations according to the prior art as follows:

Type A (prior art, U.S. Pat. No. 3,098,320): seed adhering to face of the seed stick below the soil line;

Type B (U.S. Pat. No. 3,098,320): similar to Type A, but having the seed covered by a layer of porous blotting paper;

Type C (U.S. Pat. No. 3,098,321): similar to Type B, but with the seed located in the upper end of a longitudinal slot formed in the seed stick and running from just below the soil level to the point and covered by a layer of porous blotting paper;

Type D (U.S. Pat. No. 3,098,321): similar to Type C, but with the seed located in a hole in the seed stick below the soil level and covered by a layer of porous blotting paper;

Type E (U.S. Pat. No. 3,846,954): seed located in a hole in the seed stick below soil level and held therein in a matrix of polyethylene glycol wax.

In each case identical materials were used, i.e. the same card and the same adhesive (50% aqueous gum arabic) and germination trials were performed under controlled environmental conditions for each species a four seed species with a total of 500 seeds of each species or each seed stick configuration. The percentages of seeds germinated 19 days after planting were as follows:

TABLE 1

| Seed species | Stick Type | | | | | | |
|---|---|---|---|---|---|---|---|
| | FIG. 3 | FIG. 4 | A | B | C | D | E |
| Sweet William | 72.4 | 89 | 51.2 | 55.8 | 54.2 | 39.6 | 10.5 |
| Brussels Sprouts | 79.8 | 79.4 | 78.4 | 65.6 | 68.2 | 76 | 10.8 |
| Carrots | 66.6 | 63.2 | 53.6 | 60.2 | 5.8 | 22.6 | 5.3 |

These figures show a substantial improvement in germination rate using seed sticks in accordance with this invention as compared with the prior art types.

The percentage emergence after 24 days (final emergence) was as follows:

TABLE 2

| Seed Species | Stick Type | | | | | | |
|---|---|---|---|---|---|---|---|
| | FIG. 3 | FIG. 4 | A | B | C | D | E |
| Sweet William | 88 | 94 | 79.6 | 63.6 | 64.4 | 56.2 | 19 |
| Brussels Sprouts | 92.4 | 92 | 91 | 91.4 | 74.6 | 78.6 | 12.2 |
| Carrots | 76 | 74.8 | 68.4 | 73.8 | 28 | 55.6 | 18.6 |

These figures demonstrate a general improvement in overall emergence of seeds mounted on seed sticks in accordance with this invention, although some variation is noted between various species.

We claim:

1. A seed planting device of the type comprising a flat strip insertable into the ground and carrying thereon one or more seeds, wherein the seed(s) is/are adhesively secured on the underside of a tongue projecting from one face of the strip and lying at an angle to the plane thereof.

2. A device according to claim 1, wherein said tongue is integral with the strip.

3. A device according to claim 1 or 2, wherein the adhesive is gum arabic or gum guar.

4. A device according to claim 1, wherein the strip is pointed at one end for ease of insertion into the ground and said tongue is located immediately adjacent the point.

5. A device according to any one of claim 1, wherein the strip is pointed at one end for ease of insertion into the ground and said tongue is located intermediate the ends of the strip and spaced from the pointed end.

6. A device according to claim 4 or 5, wherein the upper end of the strip remote from the point is impregnated or coated with a layer of water-impermeable material.

7. A device according to claim 6, wherein said water-impermeable material is wax.

* * * * *